(12) United States Patent
Kuroki

(10) Patent No.: US 9,870,084 B2
(45) Date of Patent: Jan. 16, 2018

(54) TOUCH PANEL APPARATUS AND ELECTRONIC APPARATUS PROVIDING TACTILE FEEDBACK TO AN OPERATOR

(71) Applicant: KYOCERA DOCUMENT SOLUTIONS INC., Osaka-shi (JP)

(72) Inventor: Akihiko Kuroki, Osaka (JP)

(73) Assignee: KYOCERA DOCUMENT SOLUTIONS INC., Osaka-shi (JP)

( * ) Notice: Subject to any disclaimer, the term of this patent is extended or adjusted under 35 U.S.C. 154(b) by 401 days.

(21) Appl. No.: 14/373,890

(22) PCT Filed: Jan. 16, 2013

(86) PCT No.: PCT/JP2013/050694
§ 371 (c)(1),
(2) Date: Jul. 22, 2014

(87) PCT Pub. No.: WO2013/111653
PCT Pub. Date: Aug. 1, 2013

(65) Prior Publication Data
US 2015/0084914 A1    Mar. 26, 2015

(30) Foreign Application Priority Data

Jan. 26, 2012 (JP) ................. 2012-014294

(51) Int. Cl.
*G06F 3/0487* (2013.01)
*G06F 3/041* (2006.01)
(Continued)

(52) U.S. Cl.
CPC ............ *G06F 3/0414* (2013.01); *G06F 3/016* (2013.01); *G06F 3/041* (2013.01); *G06F 3/0488* (2013.01);
(Continued)

(58) Field of Classification Search
CPC ...... G06F 3/016; G06F 3/0414; G06F 3/0487; G06F 2203/013–2203/015; G06F 2203/0415
See application file for complete search history.

(56) References Cited

U.S. PATENT DOCUMENTS 6,952,497 B1 * 10/2005 Hollstrom ................ B41J 2/315
382/119
2006/0146032 A1    7/2006 Kajimoto et al.
(Continued)

FOREIGN PATENT DOCUMENTS

EP    1965291 A2    9/2008
JP    2002-244789 A    8/2002
(Continued)

OTHER PUBLICATIONS

Office Action dated Oct. 9, 2015 in corresponding KR application No. 10-2014-7020144.
(Continued)

*Primary Examiner* — Sanghyuk Park
(74) *Attorney, Agent, or Firm* — Knobbe Martens Olson & Bear LLP

(57) ABSTRACT

A touch panel apparatus is provided with a strain gauge sensor (16), a piezoelectric element (17), and a control unit (1). The strain gauge sensor (16) detects the pressing force to be applied to a touch panel (12) when a select-execute function key (18) is operated. The piezoelectric element (17) makes the touch panel (12) vibrate. The control unit (1) changes the function to be selected with the operation of the select-execute function key (18), in accordance with the pressing force detected by a pressing force detection unit (20), and when an arbitrary function is continued to be selected for a prescribed period of time (T0), the function that is continued to be selected is executed. The control unit also makes, each time the function is changed, the touch
(Continued)

panel (12) vibrate with a first vibration pattern by controlling the piezoelectric element (17), and makes, when a function is to be executed, the touch panel (12) vibrate with a second vibration pattern that is different from the first vibration pattern by controlling the piezoelectric element (17).

10 Claims, 8 Drawing Sheets

(51) Int. Cl.
*G06F 3/0488* (2013.01)
*G06F 3/01* (2006.01)
*G06F 3/0484* (2013.01)

(52) U.S. Cl.
CPC .... *G06F 3/04842* (2013.01); *G06F 2203/014* (2013.01); *G06F 2203/04105* (2013.01)

(56) References Cited

U.S. PATENT DOCUMENTS

| | | | |
|---|---|---|---|
| 2008/0122315 A1 | 5/2008 | Maruyama et al. | |
| 2008/0297475 A1 | 12/2008 | Woolf et al. | |
| 2011/0181539 A1 | 7/2011 | Aono | |
| 2011/0248839 A1* | 10/2011 | Kwok | G06F 3/016 340/407.2 |
| 2012/0032801 A1* | 2/2012 | Ujii | G06F 3/016 340/540 |

FOREIGN PATENT DOCUMENTS

| | | |
|---|---|---|
| JP | 2006-155447 A | 6/2006 |
| JP | 2009-237875 A | 10/2009 |
| JP | 2010-152736 A | 7/2010 |
| JP | 2011-175364 A | 9/2011 |
| KR | 10-2004-0062956 | 7/2004 |
| WO | 03/038800 A1 | 5/2003 |

OTHER PUBLICATIONS

Extended European Search Report dated Aug. 25, 2015 in Application No. 13741478.5.
Office Action dated Oct. 29, 2015 in corresponding KR application No. 10-2014-7020144.

* cited by examiner

TOUCH PANEL APPARATUS AND ELECTRONIC APPARATUS PROVIDING TACTILE FEEDBACK TO AN OPERATOR

CROSS-REFERENCE TO RELATED APPLICATIONS

This application is the U.S. National Phase under 35. U.S.C. §371 of International Application PCT/JP2013/050694, filed Jan. 16, 2013, which claims priority to Japanese Patent Application No. 2012-014294, filed Jan. 26, 2012. The disclosures of the above-described applications are hereby incorporated by reference in their entirety. The International Application was published under PCT Article 21(2) in a language other than English.

TECHNICAL FIELD

The present invention relates to a touch panel apparatus with a touch panel being provided on a display unit, and more specifically to a touch panel apparatus having a function of providing tactile feedback to an operator by vibrating the touch panel and an electronic apparatus provided with the touch panel apparatus.

BACKGROUND ART

In recent years, for a touch panel apparatus with a touch panel being provided on a display unit, a technology called forced feedback that provides tactile feedback from an operation key being pressed to an operator has been proposed (see for example Patent Document 1). In Patent Document 1, a piezoelectric element is provided on the touch panel. In the technology disclosed in Patent Document 1, tactile feedback is provided to an operator by vibrating the touch panel as a result of contractive deformation of the piezoelectric element by applying voltage to the piezoelectric element in response to the operator's touch on an operation face of the touch panel.

A technology that detects a pressing force applied on an operation key by a pressure sensor for selection and execution of a particular function, as well as adjustment and change of properties of functions according to the pressing force thus detected has also been proposed (see for example Patent Document 2). In the technology disclosed in Patent Document 2, an operator is notified of a selected function or properties thereof by means of vibration generated every time the pressing force exceeds a preset threshold.

Patent Document 1: Japanese Unexamined Patent Application Publication No. 2011-175364

Patent Document 1: Japanese Unexamined Patent Application Publication No. 2002-244789

DISCLOSURE OF THE INVENTION

Problems to be Solved by the Invention

Also for a touch panel apparatus, selection and execution of a function according to a pressing force being applied have been considered. However, it is difficult to employ the technology of Patent Document 1 and the technology of Patent Document 2 simultaneously. In other words, in a case in which the technology of forced feedback of Patent Document 1 is employed, it is difficult for an operator to distinguish whether the vibration of the touch panel is for providing a touch sensation of the operation key to the operator or for notifying the operator of execution of a function.

The objective of the present invention is to provide a touch panel apparatus that allows an operator to distinguish between vibration for providing a touch sensation of the operation key to the operator and vibration for notifying the operator of execution of a function being selected.

Means for Solving the Problems

The touch panel apparatus according to the present invention is provided with a display unit, a touch panel, a pressing force detection unit, a vibration driving unit, and a control unit. The display unit displays the select-execute function key accepting selection and execution of a plurality of functions. The touch panel is disposed on a display face of the display unit and accepts an operation with respect to the select-execute function key. The pressing force detection unit detects a pressing force with respect to the touch panel upon operation of the select-execute function key. The vibration driving unit vibrates the touch panel. The display unit changes a function to be selected by the operation of the select-execute function key depending on the pressing force detected by the pressing force detection unit and, in a case in which an arbitrary function is continuously selected for a preset period of time, executes the continuously selected function. The control unit vibrates the touch panel in the first vibration pattern by controlling the vibration driving unit every time the function is changed, and vibrates the touch panel in a second vibration pattern that is different from the first vibration pattern by controlling the vibration driving unit when the function is executed.

Effects of the Invention

The present invention is configured to: change a function according to a pressing force of an operation of the select-execute function key; if a function is continuously selected for a preset period of time, execute the selected function; vibrate the touch panel in the first vibration pattern every time a function is changed; and vibrate the touch panel in the second vibration pattern that is different from the first vibration pattern by controlling a vibration driving means when a function is executed. As a result, the present invention can provide a tactile sensation of pressure of an operation key in the first vibration pattern, and, at a moment where the tactile sensation of pressure of an operation key is not required, notification of execution of a selected function in the second vibration pattern. Given this, the present invention provides an effect of allowing distinction between the tactile sensation of pressure of an operation key and vibration for notification of execution of a selected function.

EXPLANATION OF REFERENCE NUMERALS

Figure 1:
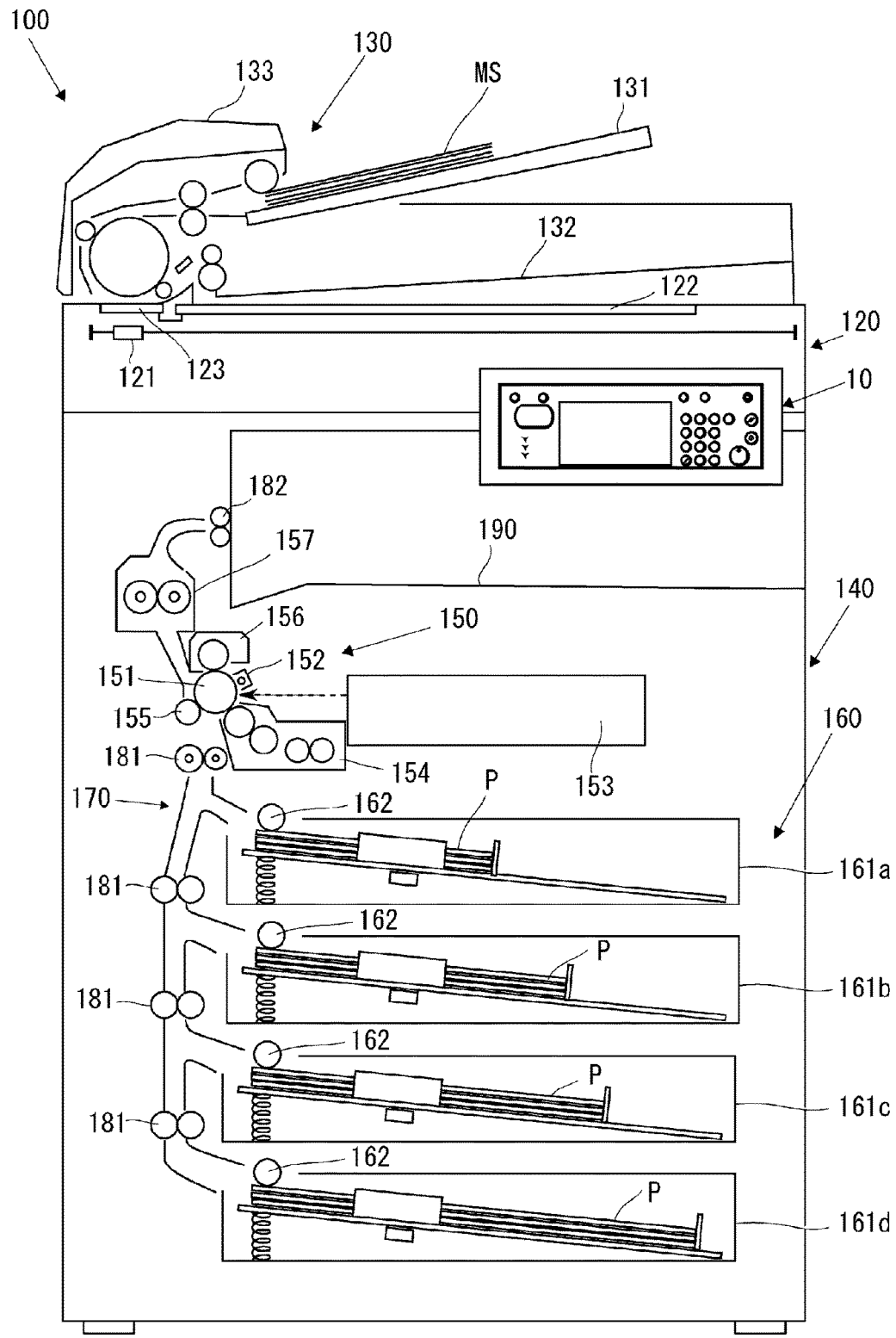
FIG. 1 is a schematic vertical cross-sectional view illustrating an image forming apparatus provided with a touch panel apparatus according to an embodiment of the present invention.

1 Control unit
2 Storage unit
3 Image processing unit
10 Touch panel apparatus
11 Display unit
12 Touch panel
13 Housing
14, 15 Elastic members
16 Strain gauge sensor
17 Piezoelectric element
18 Select-execute function key
19 Function-classified operation key display area
20 Pressing force detection unit
21 Vibration driving unit
100 Image forming apparatus
120 Original reading unit
121 Scanner
122 Platen glass
123 Original reading slit
130 Original feeding unit
131 Original mounting unit
132 Original discharge portion
133 Original conveying mechanism
140 Recording unit
150 Image forming unit
151 Photosensitive drum
152 Charging unit
153 Exposing unit
154 Developing unit
155 Transfer unit
156 Cleaning unit
157 Fixing unit
160 Paper feeding unit
161a to 161d Paper feeding cassettes
162 Paper feeding roller
170 Paper path
181 Conveyance roller
182 Discharging roller
190 Discharging tray

PREFERRED MODE FOR CARRYING OUT THE INVENTION

An embodiment of the present invention is described specifically with reference to the drawings. An image forming apparatus 100 provided with a touch panel apparatus 10 according to the present embodiment is a copy machine. With reference to FIG. 1, the image forming apparatus 100 includes an original reading unit 120, an original feeding unit 130, and a recording unit 140. The original reading unit 120 is disposed above the recording unit 140. The original feeding unit 130 is disposed above the original reading unit 120. The image forming apparatus 100 is described herein as a copy machine; however, the image forming apparatus 100 also includes a scanner, a multifunction peripheral, and the like.

Figure 2:
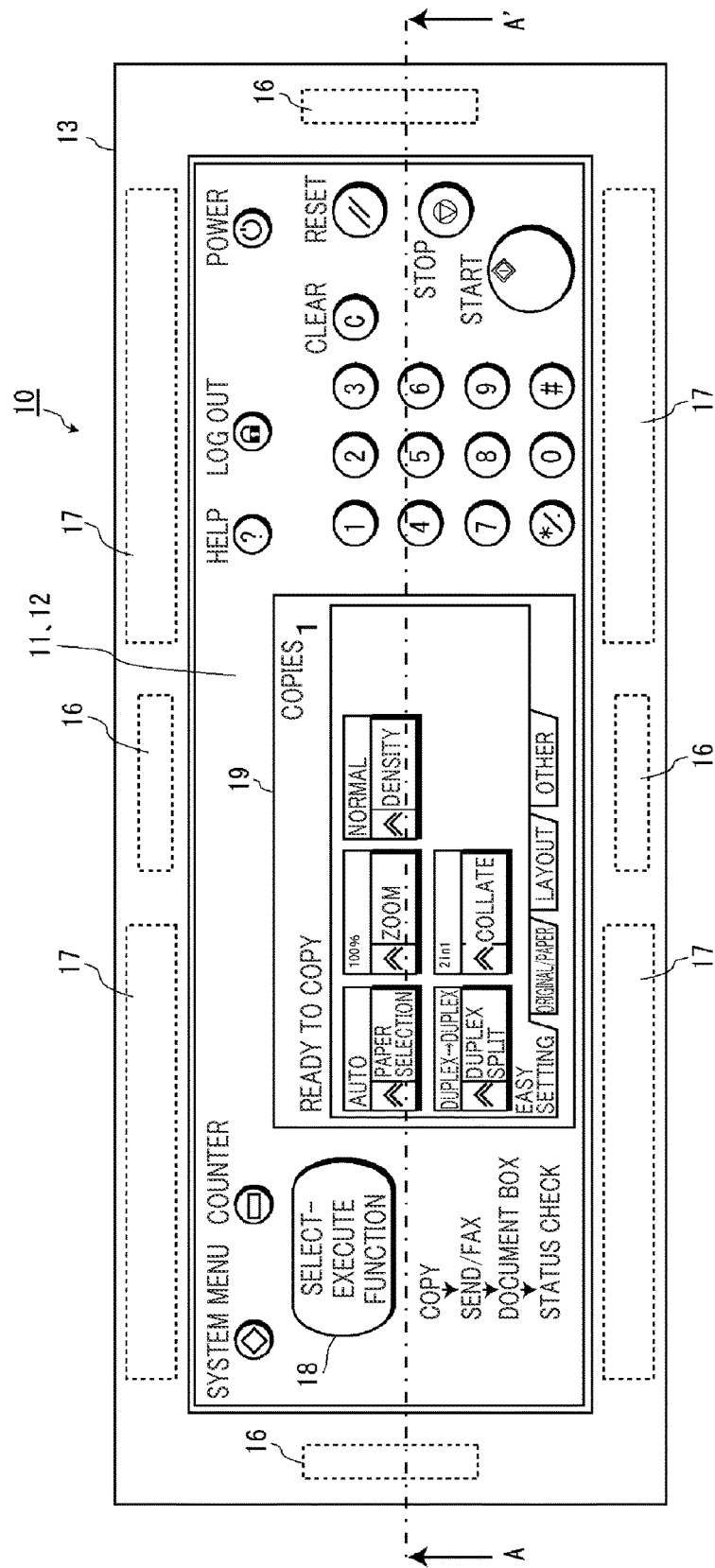
FIG. 2 is a front view illustrating the touch panel apparatus shown in FIG. 1.
Figure 3:
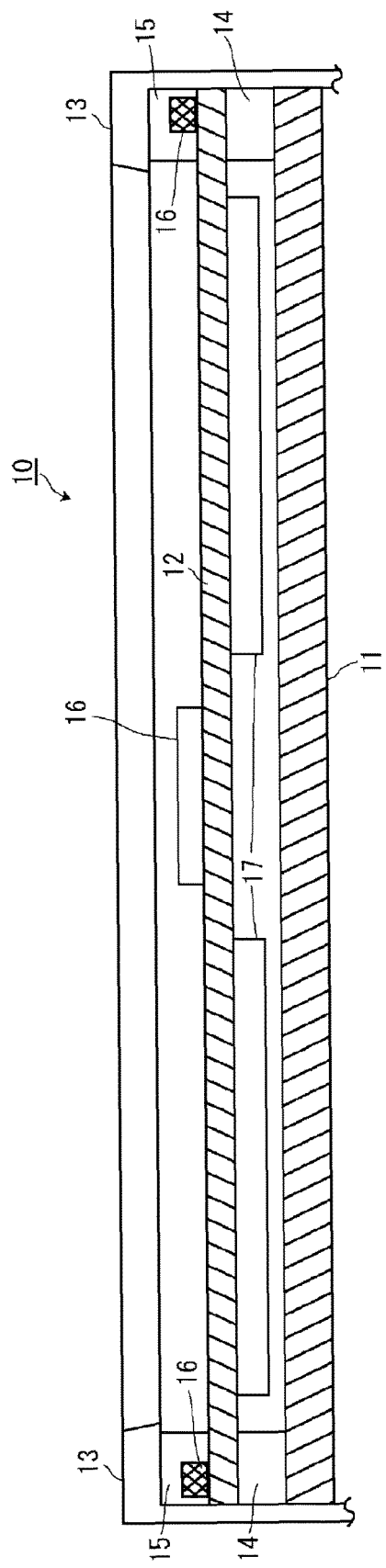
FIG. 3 is a cross-sectional view taken along a line A-A' shown in FIG. 2.

The touch panel apparatus 10 that makes settings and an operation instruction of the image forming apparatus 100 is provided on a front face side (front side in FIG. 1) of the image forming apparatus 100. As shown in FIGS. 2 and 3, the touch panel apparatus 10 includes a display unit 11 and a touch panel 12. The display unit 11 displays various operation keys that accept an operation input. The touch panel 12 is provided on a display face of the display unit 11. The touch panel 12 accepts an operation with respect to an operation key displayed on the display unit 11 by detecting an input by pressing with an operator's fingertip, a stylus pen, or the like, and outputting a signal corresponding to a position where the input is detected. For example, a liquid crystal display panel can be used as the display unit 11. For example, a touch panel of a resistance film type or a capacitance type can be used as the touch panel 12. In the present embodiment, a touch panel having a structure that is bent (strained) to a slight degree according to the pressing force of pressing is employed.

As shown in FIG. 3, the display unit 11 is arranged and supported in a housing 13. The touch panel 12 is supported on the display unit 11 through an elastic member 14. An upper cover for covering the display unit 11 and a peripheral region of the touch panel 12 is provided in the housing 13. An elastic member 15 is provided between the upper cover and the touch panel 12. A strain gauge sensor 16 is adhered to a surface of the touch panel 12 in a region covered by the upper cover of the housing 13. A belt-like piezoelectric element 17 is adhered to a back face of the touch panel 12. The strain gauge sensor 16 functions as the pressing force detection unit that detects a pressing force applied to the touch panel 12. The piezoelectric element 17 functions as the vibration driving unit that vibrates the touch panel 12.

As shown in FIG. 2, the touch panel apparatus 10 includes a permanent operation key, the select-execute function key 18, and a function-classified operation key display area 19. The permanent operation key includes numerical keys, a reset key, a stop key, a start key, and the like. The numerical keys are keys allowing input of a numerical value such as the number of copies. The reset key is a key allowing input of an instruction for initializing setting information. The stop key is a key for stopping a copy operation or for clearing a numerical value being input. The start key is a key allowing input of an output instruction for starting a printing operation. The select-execute function key 18 switches between function modes according to a pressing force applied to the touch panel 12. A function-classified operation key corresponding to the function mode switched by the select-execute function key 18 is displayed in the function-classified operation key display area 19.

As shown in FIG. 1, the original reading unit 120 includes a scanner 121, a platen glass 122, and an original reading slit 123. The scanner 121 is composed of an exposure lamp, a CCD (Charge Coupled Device) sensor and the like, and movable along a conveying direction of an original MS in the original feeding unit 130. The platen glass 122 is a platen composed of a transparent member such as glass. The original reading slit 123 includes a slit that extends in a direction orthogonal to the conveying direction of the original MS in the original feeding unit 130.

In a case of reading the original MS placed on the platen glass 122, the scanner 121 is moved to a position facing the platen glass 122. The scanner 121 reads the original MS by scanning the original MS placed on the platen glass 122, to thereby obtain image data. The scanner 121 outputs the image data thus obtained to the recording unit 140. On the other hand, in a case of reading the original MS being fed by the original feeding unit 130, the scanner 121 is moved to a position facing the original reading slit 123. The scanner 121 reads the original MS through the original reading slit 123, in sync with the conveying operation of the original MS by the original feeding unit 130, to thereby obtain image data. The scanner 121 outputs the image data thus obtained to the recording unit 140.

The original feeding unit 130 includes an original mounting unit 131, an original discharge portion 132, and an original conveying mechanism 133. The original conveying mechanism 133 feeds the original MS placed on the original mounting unit 131 sheet by sheet. The original MS being fed by the original conveying mechanism 133 is conveyed to a position facing the original reading slit 123 on the original reading unit 120, and then discharged to the original discharge portion 132. A front side of the original feeding unit 130 can be lifted upward. By lifting the front side of the original feeding unit 130, an upper face of the platen glass 122 can be exposed.

The recording unit 140 includes, in addition to an image forming unit 150, a paper feeding unit 160, a paper path 170, a conveyance roller 181, a discharging roller 182, and a discharging tray 190.

The paper feeding unit 160 includes a plurality of paper feeding cassettes 161*a* to 161*d* and a paper feeding roller 162. Printing paper P is housed in the paper feeding cassettes 161*a* to 161*d*. The paper feeding roller 162 feeds the printing paper P sheet by sheet from the paper feeding cassettes 161*a* to 161*d* to the paper path 170. The paper feeding roller 162, the conveyance roller 181, and the discharging roller 182 function as the conveying unit. The printing paper P is conveyed by the conveying unit. The printing paper P that is fed by the paper feeding roller 162 to the paper path 170 is conveyed by the conveyance roller 181 to the image forming unit 150. The printing paper P with the image data being recorded by the image forming unit 150 is discharged to the outside of the apparatus by the discharging roller 182. The printing paper P with the image data being recorded is guided by the discharging roller 182 and discharged to the discharging tray 190.

The image forming unit 150 includes a photosensitive drum 151, a charging unit 152, an exposure unit 153, a developing unit 154, a transfer unit 155, a cleaning unit 156, and a fixing unit 157. The exposure unit 153 is an optical unit provided with a laser device, a mirror, and the like. The exposure unit 153 outputs a laser beam based on the image data and exposes a surface of the photosensitive drum 151. The surface of the photosensitive drum 151 is electrically charged by the charging unit 152 prior to exposure. Therefore, an electrostatic latent image is formed on the surface of the photosensitive drum 151 being exposed. The developing unit 154 is a developing unit that develops the electrostatic latent image formed on the surface of the photosensitive drum 151 using a toner. A toner image based on the electrostatic latent image is formed on the photosensitive drum 151 by the developing unit 154. The transfer unit 155 transfers the toner image formed on the photosensitive drum 151 by the developing unit 154 onto the printing paper P. The fixing unit 157 fixes the toner image onto the printing paper P by heating the printing paper P onto which the toner image has been transferred by the transfer unit 155.

Next, a control system of the image forming apparatus 100 is described with reference to FIG. 4. In the image forming apparatus 100, the touch panel apparatus 10, the original reading unit 120, the original feeding unit 130, the image forming unit 150, and the conveyance unit (the paper feeding roller 162, the conveyance roller 181, and the discharging roller 182) are connected to the control unit 1 and operation thereof is controlled by the control unit 1. In addition, a storage unit 2 and an image processing unit 3 are also connected to the control unit 1.

The control unit 1 is an image processing unit such as a microcomputer provided with ROM (Read Only Memory), RAM (Random Access Memory), and the like. A control program for control of operation of the image forming apparatus 100 is stored in the ROM. The control unit 1 reads the control program stored in the ROM and develops the control program to the RAM, to thereby control the entire apparatus according to predetermined instruction information and the like being input from the touch panel apparatus 10.

The storage unit 2 is composed of semiconductor memory, a HDD (Hard Disk Drive), or the like. The image data obtained by reading the original by the original reading unit 120 is stored in the storage unit 2.

The image processing unit 3 performs predetermined image processes with respect to the image data. For example, a zooming process, and image improvement processes such as density adjustment, tone adjustment, and the like are performed by the image processing unit 3.

Figure 4:
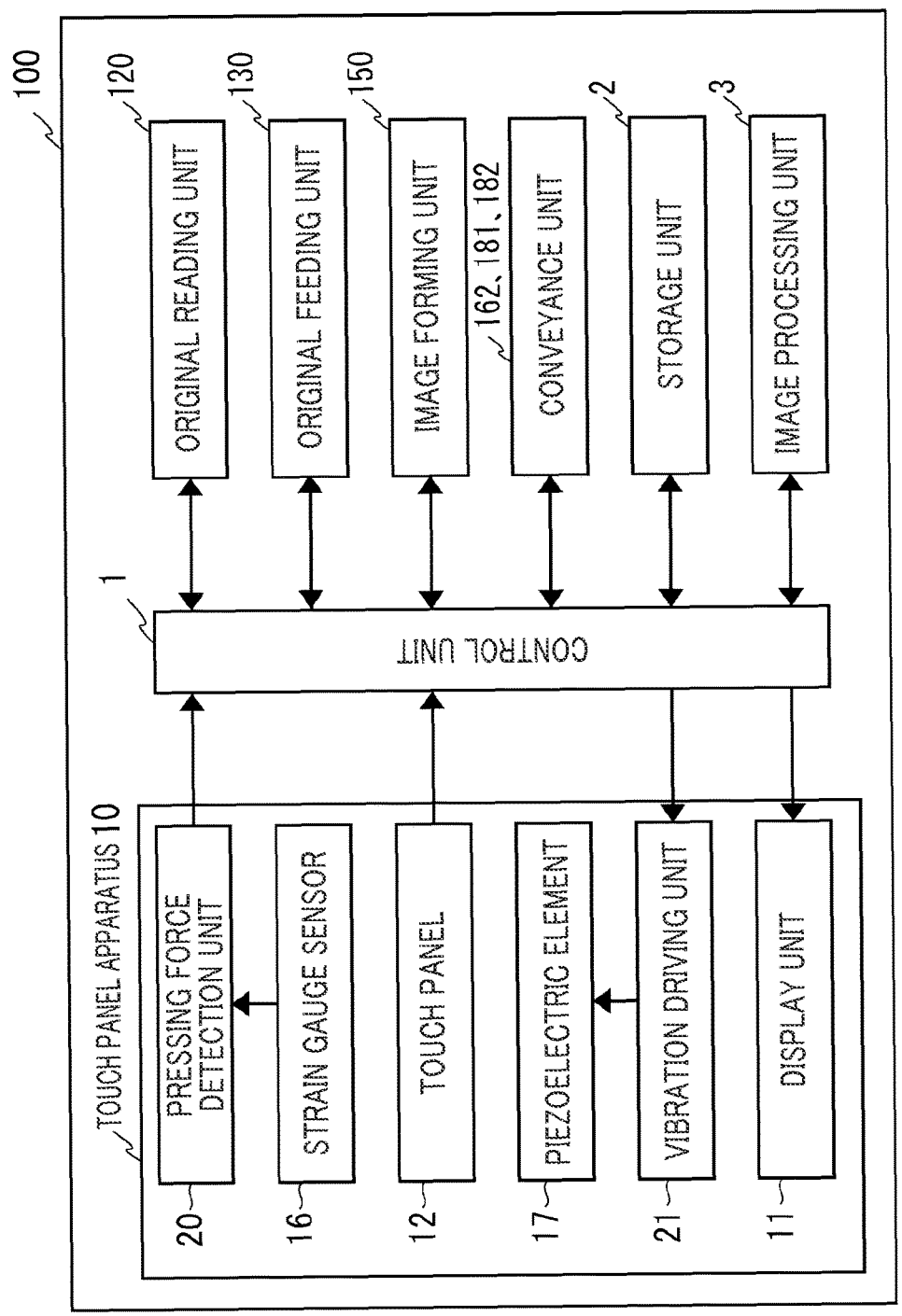
FIG. 4 is a block diagram illustrating a control system of the image forming apparatus shown in FIG. 1.

As shown in FIG. 4, the touch panel apparatus 10 includes a pressing force detection unit 20 and a vibration driving unit 21. The pressing force detection unit 20 detects a pressing force applied to the touch panel 12 based on an output (an average output value of the four strain gauge sensors 16) from the strain gauge sensor 16 and outputs the pressing force thus detected to the control unit 1. Detection of the pressing force by the pressing force detection unit 20 is always in operation. The control unit 1 monitors temporal change of the pressing force applied to the touch panel 12. The vibration driving unit 21 applies a voltage signal to the piezoelectric element 17 based on control by the control unit 1, to thereby vibrate the touch panel 12.

Figure 5A:
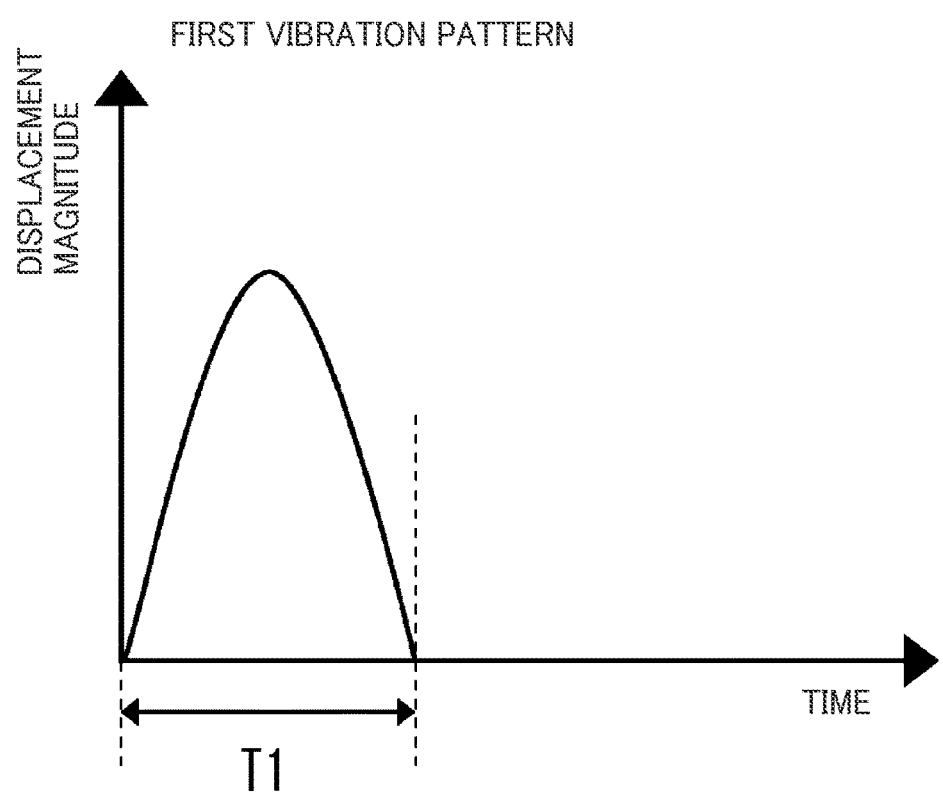
FIG. 5A is a diagram showing an example of a first vibration pattern of a touch panel shown in FIGS. 2 and 3.

Next, operation of the touch panel apparatus 10 according to the present embodiment is described in detail with reference to FIGS. 5A to 7. The image forming apparatus 100 is configured to operate in four function modes: "Copy"; "Send/Fax", "Document Box", and "Status Check". The function mode is switched by the select-execute function key 18. As shown in FIG. 2, the permanent operation keys such as the numerical keys, the reset key, the stop key, the start key, and the like that are used in any of the function modes, are assigned to the touch panel apparatus 10. The function-classified operation key display area 19, in which function-classified operation keys corresponding to the function mode are displayed, is also assigned to the touch panel apparatus 10. Since the permanent operation keys are used more often than the function-classified operation keys, an operation sensation is required. For this reason, in many cases, physical keys are used for the permanent operation keys. On the contrary, in the present embodiment, the permanent operation keys are assigned to the touch panel 12. In a case of accepting an operation to a region on the touch panel 12 in which the permanent operation keys are assigned, the control unit 1 controls the vibration driving unit 21 to vibrate the touch panel 12. The tactile sensation from the vibration of the touch panel 12 is fed back to the operator. In a case of vibration in response to an operation to the region of the permanent operation keys, the vibration driving unit 21 applies a voltage signal of 1 pulse to the piezoelectric element 17. As a result, as shown in FIG. 5A, the touch panel 12 vibrates in such a way that the operation face side thereof is elevated once (hereinafter referred to as a first vibration pattern). The operator can thus receive a tactile sensation as if a physical key is being used. In the present embodiment, in a case of accepting an operation to the region of the function-classified operation keys displayed in the function-classified operation key display area 19, the control unit 1 does not vibrate the touch panel 12. Operation sensation is thus differentiated between the permanent operation keys and the function-classified operation keys. Alternatively, in a case of accepting an operation to the region of the function-classified operation keys, the touch panel 12 can vibrate in a vibration pattern that is different from the first vibration pattern in response to an operation to the permanent operation keys.

Figure 6:
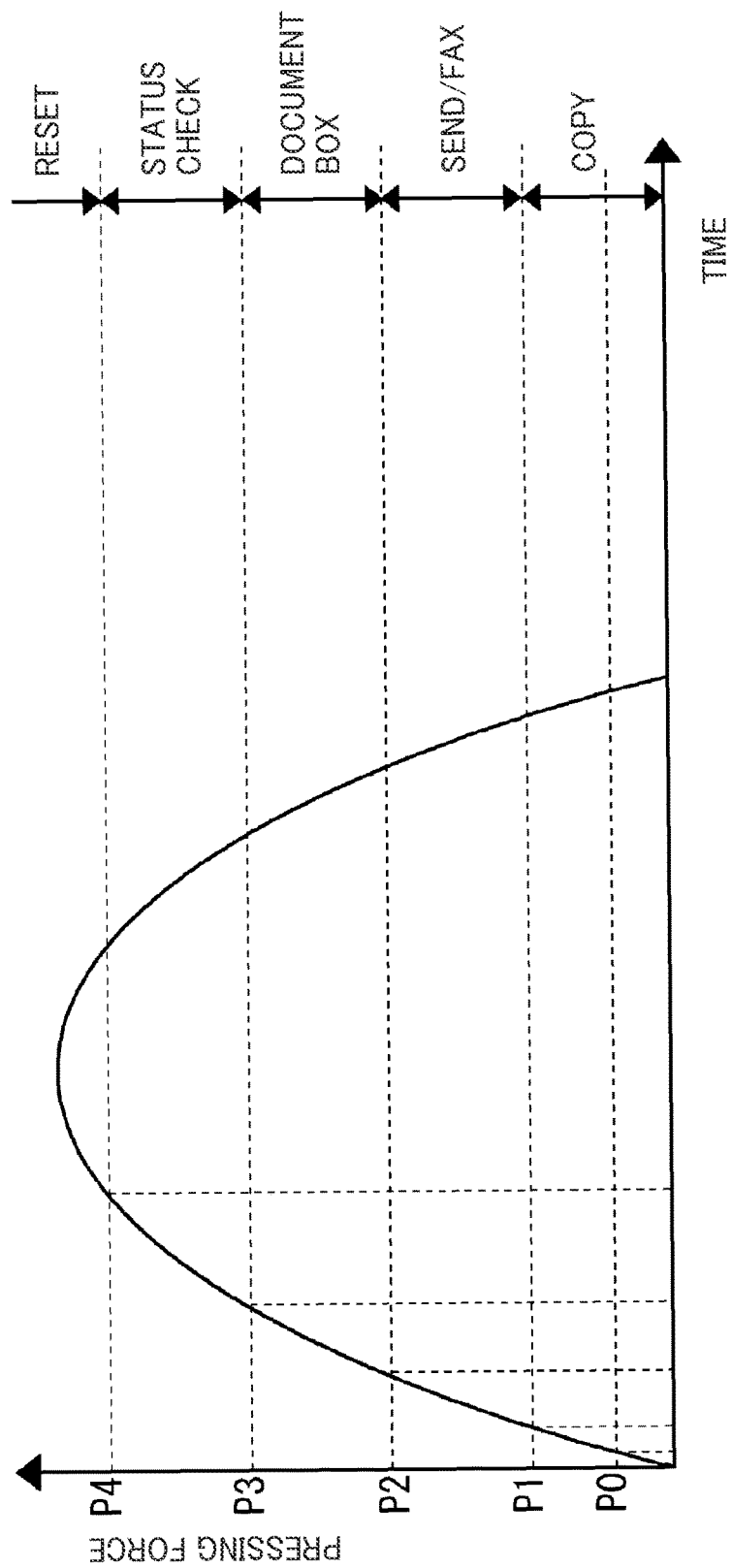
FIG. 6 is a diagram showing an example of a pressing force upon operation of a select-execute function key shown in FIG. 2.

In a case of accepting an operation to the region of the permanent function keys, the touch panel 12 is vibrated in the first vibration pattern upon acceptance of the operation. On the other hand, in a case of accepting an operation to the region of the select-execute function key 18, the touch panel 12 is vibrated in the first vibration pattern every time the function mode is changed. More specifically, every time the pressing force exceeds a preset threshold, in other words every time the function mode is changed by the operation to the select-execute function key 18, the touch panel 12 is vibrated in the first vibration pattern. In the present embodiment, as shown in FIG. 6, four thresholds P1 to P4 are defined for the four function modes. The function modes are assigned to the pressing force of the operation to the select-execute function key 18 (in other words, a pressing force accepted by the region of the touch panel 12 in which the select-execute function key 18 is assigned). In the present embodiment, a range of the accepted pressing force between the thresholds P0 and P1 is assigned to "Copy", a range between the thresholds P1 and P2 is assigned to "Send/Fax", a range between the thresholds P2 and P3 is assigned to "Document Box", and a range between the thresholds P3 and P4 is assigned to "Status Check".

A selection operation of the function mode is described with reference to FIG. 6. When an operator presses the select-execute function key 18, the operation is accepted as the pressing force reaches the threshold P0. Positional information of the select-execute function key 18 is notified from the touch panel 12 to the control unit 1. The control unit 1 controls the vibration driving unit 21 to vibrate the touch panel 12 in the first vibration pattern. Here, the control unit 1 monitors the pressing force detected by the pressing force detection unit 20. Given this, the control unit 1 controls the vibration driving unit 21 every time the pressing force exceeds the thresholds P0, P1, P2, and P3 to vibrate the touch panel 12 in the first vibration pattern. As a result, the operator can understand the function mode being selected, based on the number of vibrations in the first vibration pattern. More specifically, the operator can understand that, after pressing the select-execute function key 18: "Copy" is selected if the touch panel 12 vibrates once in the first vibration pattern; "Send/Fax" is selected if the touch panel 12 vibrates twice; "Document Box" is selected if the touch panel 12 vibrates three times; and "Status Check" is selected if the touch panel 12 vibrates four times. As described above, the touch panel 12 vibrates in the first vibration pattern every time the function mode is selected, and the operator can receive a tactile sensation as if using a multi-stage switch.

Figure 5B:
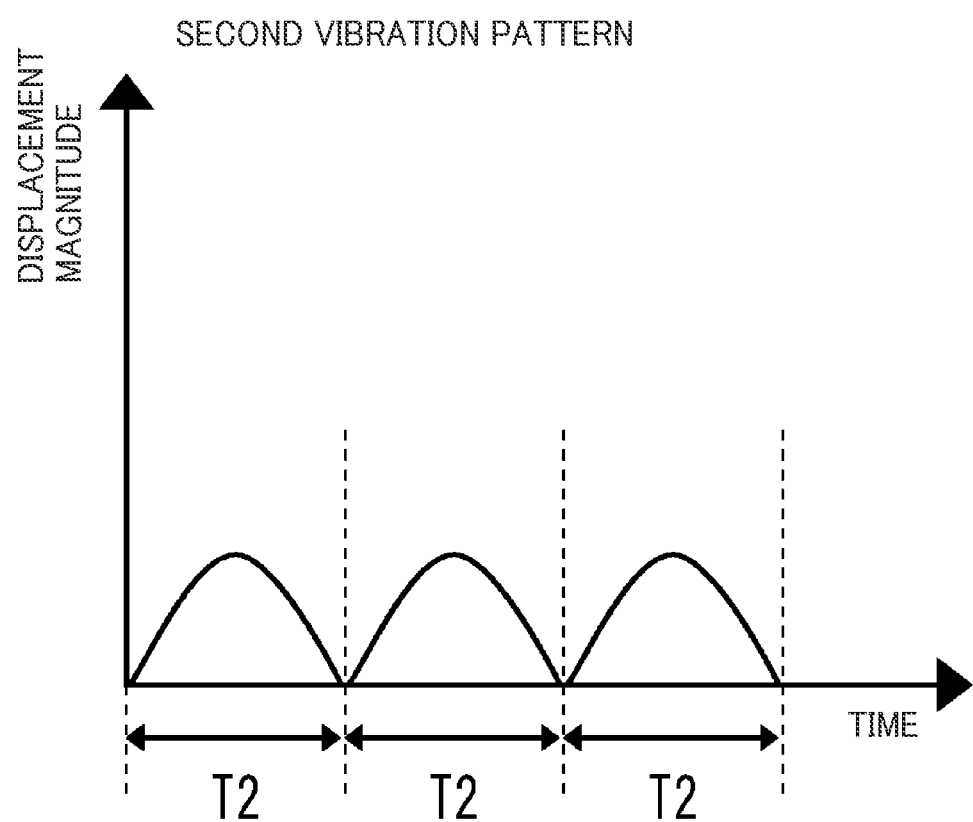
FIG. 5B is a diagram showing an example of a second vibration pattern of the touch panel shown in FIGS. 2 and 3.
Figure 7:
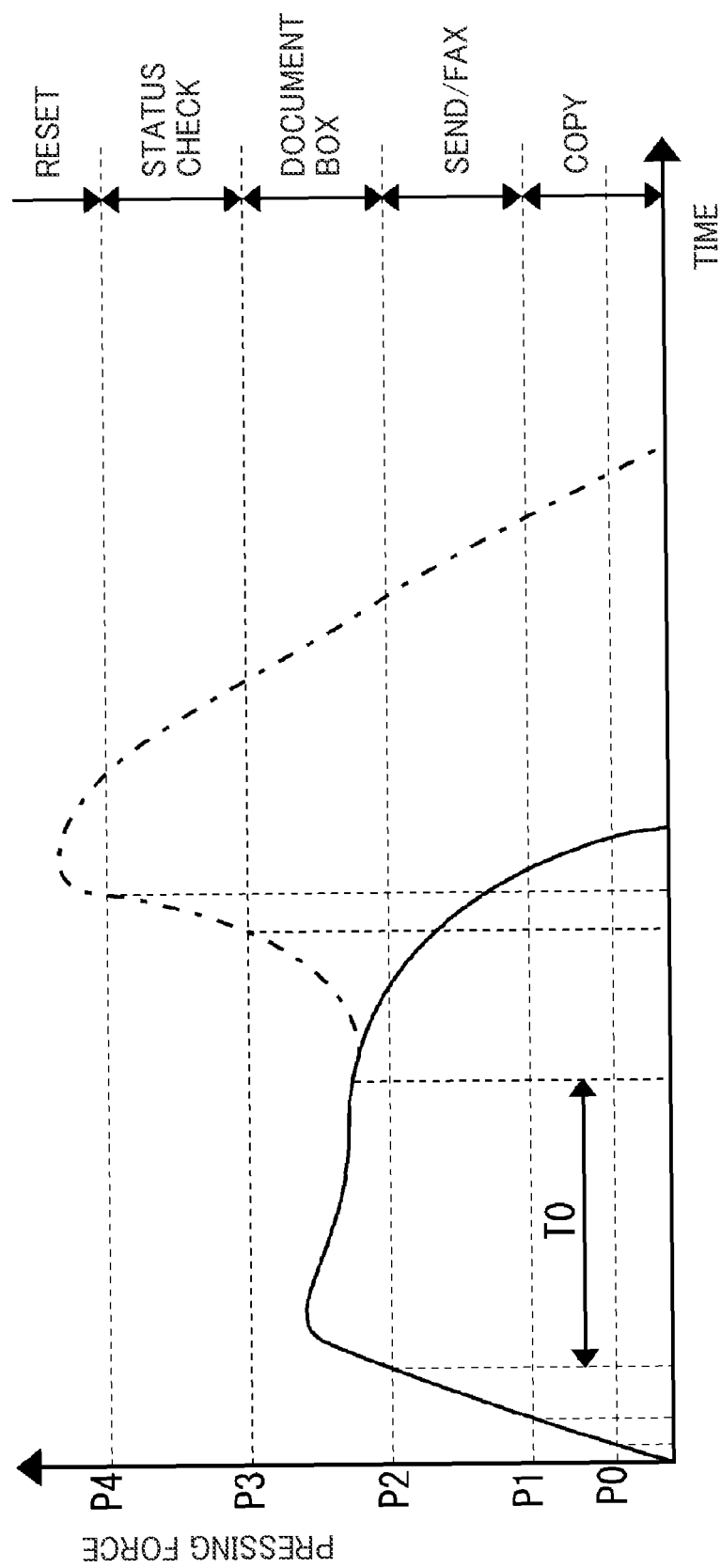
FIG. 7 is a diagram showing another example of a pressing force upon operation of the select-execute function key shown in FIG. 2.

Next, a function execution operation that executes switching of the function modes is described with reference to FIG. 7. The control unit 1 monitors the pressing force detected by the pressing force detection unit 20. Given this, in a case in which the same function mode is continuously selected for a preset period of time T0, the control unit 1 executes switching to the function mode. For example, as shown by a solid line in FIG. 7, in a case in which the preset period of time T0 elapses while the operator presses the select-execute function key 18 and maintains the pressing force between the threshold P2 and P3 (while "Document Box" is selected), the control unit 1 executes switching to the function mode "Document Box". In addition, when the function mode is switched, the control unit 1 vibrates the touch panel 12 in the second vibration pattern that is different from the first vibration pattern by controlling the vibration driving unit 21. The control unit 1 thus notifies the operator of the switching of the function mode. A plurality of short-period vibrations is used as the second vibration pattern. More specifically, the vibration driving unit 21 applies a voltage signal of multiple pulses that is weaker than that of the first vibration pattern to the piezoelectric element 17. As a result, as shown in FIG. 5B, the touch panel 12 vibrates in such a way that the operation face side thereof is elevated successively for a plurality of times. Here, a vibration period T2 of one vibration in the second vibration pattern is shorter than a vibration period T1 of the first vibration pattern. As a result, from the vibration in response to switching of the function modes, the operator can perceive a tactile sensation that is different from that of the operation of the select-execute function key 18.

A range of the pressing force of pressure of the select-execute function key 18 above the threshold P4 is assigned to "Reset". In other words, a range beyond the range of the pressing force to which selections of the function modes are assigned is assigned to "Reset", which cancels switching of the function mode. Given this, as shown by a dashed-dotted line in FIG. 7, if the select-execute function key 18 is further pressed after execution of switching to the function mode "Document Box" and the pressing force exceeds the threshold P4, the control unit 1 cancels the switching to the function mode "Document Box" and resets the function mode to an initial function mode (for example, "Copy"). As a result, even in a case in which the function mode is erroneously switched to an undesired function mode, the operator can easily cancel the switching of the function mode by further pressing the select-execute function key 18.

In the present embodiment, switching of the function mode is performed by an operation of the select-execute function key 18. However, functions to be selected and executed by an operation of the select-execute function key 18 are not limited. For example, the select-execute function key 18 can also be used as a key for instructing switching to a sleep mode. In such a case, a range of a weaker pressing force on the select-execute function key 18 can be assigned to light sleep and a range of a stronger pressing force can be assigned to deep sleep.

As described above, the present embodiment includes the display unit 11, the touch panel 12, the pressing force detection unit 20 (the strain gauge sensors 16), the vibration driving unit 21 (the piezoelectric element 17), and the control unit 1. The display unit 11 displays the select-execute function key 18 accepting selection and execution of a plurality of functions. The touch panel is disposed on a display face of the display unit 11 and accepts an operation with respect to the select-execute function key 18. The pressing force detection unit 20 detects a pressing force with respect to the touch panel 12 upon operation of the select-execute function key 18. The vibration driving unit 21 vibrates the touch panel 12. The display unit 11 changes a function to be selected by the operation of the select-execute function key 18 depending on the pressing force detected by the pressing force detection unit 20 and, in a case in which an arbitrary function is continuously selected for a preset period of time T0, executes the continuously selected function. The control unit 1 vibrates the touch panel 12 in the first vibration pattern by controlling the vibration driving unit 21 every time the function is changed, and vibrates the touch panel 12 in a second vibration pattern that is different from the first vibration pattern by controlling the vibration driving unit 21 when the function is executed. Since the present embodiment can thus notify the operator of execution of a selected function at a moment where the tactile sensation of pressure of an operation key is not required, an effect of allowing the operator to distinguish between the vibration for providing a tactile sensation of pressure of the operation key and the vibration for notifying execution of the selected operation can be provided.

In addition, in the present embodiment, the vibration driving unit 21, in the first vibration pattern, vibrates the touch panel 12 in such a way that an operation face side of the touch panel 12 is elevated once, and, in the second vibration pattern, vibrates the touch panel in such a way that the operation face side of the touch panel 12 is elevated for a plurality of times. As a result, the present embodiment provides an effect of providing the tactile sensation of pressure of an operation key to the operator through the first vibration pattern, and notifying the operator of execution of a selected function through the second vibration pattern.

Furthermore, in the present embodiment, in a case in which the pressing force detected by the pressing force detection unit 20 exceeds a range to which the plurality of functions is assigned, the control unit 1 cancels execution of the plurality of functions. As a result, even in a case in which an undesired function is executed, the operator can easily cancel the execution of the function.

It should be noted that, in the present Specification, the touch panel apparatus 10 according to the present invention is applied as a constituent feature of the image forming apparatus 100 and performs setting and operation instructions for the image forming apparatus 100. However, the use of the touch panel apparatus 10 according to the present invention is not limited to the image forming apparatus 100. For example, the present invention can be widely applied to various electronic devices such as a mobile phone, a smart phone, a tablet terminal, and the like. In addition, the present invention is not limited to the above described embodiment and can be modified as appropriate within a scope of technical idea of the present invention. Moreover, the number, positions, shapes and the like of the above described constituent features are not limited to the embodiment, and the number, positions, shapes and the like that are preferable for practicing the present invention can be selected. It should be noted that, in the drawings, the same constituent feature is referred by the same reference symbol.

What is claimed is:

1. A touch screen apparatus comprising:
a display that displays a select-execute function key accepting selection and execution of a plurality of functions;
a touch panel that is disposed on a display face of the display unit and accepts an operation performed by a user through the select-execute function key;
a detector of pressing force that detects a pressing force applied to the touch panel in response to the operation performed by the user through the select-execute function key;
a vibration driver that vibrates the touch panel; and
a controller that changes a function to be selected by the operation of the select-execute function key according to the pressing force detected by detector and a plurality of preset thresholds to which the plurality of functions is assigned,
wherein the controller causes:
the touch panel to vibrate in a first vibration pattern by controlling the vibration driver every time the function is changed;
the function to be executed when a predetermined amount of time elapses, during which the pressing force corresponding to the function is maintained within a range by the user; and
the touch panel to vibrate in a second vibration pattern that is different from the first vibration pattern by controlling the vibration driver when the function is executed.

2. The touch panel apparatus according to claim 1, wherein the vibration driver, in the first vibration pattern, vibrates the touch panel in such a way that an operation face side of the touch panel is elevated once, and, in the second vibration pattern, vibrates the touch panel in such a way that the operation face side of the touch panel is elevated for a plurality of times.

3. The touch panel apparatus according to claim 2, wherein, in a case in which the pressing force detected by the pressing force detector exceeds a maximum of the plurality of preset thresholds, the controller it cancels execution of the plurality of functions.

4. The touch panel apparatus according to claim 1, wherein, in a case in which the pressing force detected by the detector exceeds a maximum of the plurality of preset thresholds, the controller cancels execution of the plurality of functions.

5. A touch panel apparatus including: a display that displays a select-execute function key accepting selection and execution of a plurality of functions;
a touch panel that is disposed on a display face of the display and accepts an operation performed by a user through the select-execute function key;
a pressing force detector that detects a pressing force applied to the touch panel in response to the operation performed by the user through the select-execute function key;
a vibration driver that vibrates the touch panel; and
a controller that changes a function to be selected by the operation of the select-execute function key according to the pressing force detected by the pressing force detector and a plurality of preset thresholds to which the plurality of functions is assigned, and that executes the function when a redetermined amount of time elapses, during which the pressing force corresponding to the function is maintained within a range by the user,
wherein, in a case in which the pressing force detected by the pressing force detector exceeds a maximum of the plurality of preset thresholds, the controller cancels execution of the plurality of functions.

6. An electronic apparatus comprising a touch panel apparatus including: a display that displays a select-execute function key accepting selection and execution of a plurality of functions;
a touch panel that is disposed on a display face of the display and accepts an operation performed by a user through the select-execute function key;

a detector of pressing force that detects a pressing force applied to the touch panel in response to the operation performed by the user through the select-execute function key;

a vibration driver that vibrates the touch panel; and a controller that changes a function to be selected by the operation of the select-execute function key according to the pressing force detected by the detector and a plurality of preset thresholds to which the plurality of functions is assigned, wherein the controller causes:

the touch panel to vibrate in a first vibration pattern by controlling the vibration driver every time the function is changed;

the function to be executed when a predetermined amount of time elapses, during which the pressing force corresponding to the function is maintained within a range by the user; and the touch panel to vibrate in a second vibration pattern that is different from the first vibration pattern by controlling the vibration driver when the function is executed.

7. The electronic apparatus comprising a touch panel apparatus according to claim 6, wherein the vibration driver, in the first vibration pattern, vibrates the touch panel in such a way that an operation face side of the touch panel is elevated once, and, in the second vibration pattern, vibrates the touch panel in such a way that the operation face side of the touch panel is elevated for a plurality of times.

8. The electronic apparatus comprising a touch panel apparatus according to claim 7, wherein, in a case in which the pressing force detected by the detector exceeds a maximum of the plurality of preset thresholds, the controller cancels execution of the plurality of functions.

9. The electronic apparatus comprising a touch panel apparatus according to claim 6, wherein, in a case in which the pressing force detected by the detector exceeds a maximum of the plurality of preset thresholds, the controller cancels execution of the plurality of functions.

10. An electronic apparatus comprising a touch panel apparatus including: a display that displays a select-execute function key accepting selection and execution of a plurality of functions;

a touch panel that is disposed on a display face of the display and accepts an operation performed by a user through the select-execute function key;

a detector of pressing force that detects a pressing force applied to the touch panel in response to the operation performed by the user through the select-execute function key;

a vibration driver that vibrates the touch panel; and a controller that changes a function to be selected by the operation of the select-execute function key according to the pressing force detected by the detector and a plurality of preset thresholds to which the plurality of functions is assigned, and that executes the function when a predetermined amount of time elapses, during which the pressing force corresponding to the function is maintained within a range by the user, wherein, in a case in which the pressing force detected by the detector exceeds a maximum of the plurality of preset thresholds, the controller cancels execution of the plurality of functions.

* * * * *